Patented Apr. 11, 1950

2,503,790

UNITED STATES PATENT OFFICE 2,503,790

FLUORESCENT COLORING MATERIALS

John A. C. Yule, Rochester, N. Y., assignor to Eastman Kodak Company, Rochester, N. Y., a corporation of New Jersey No Drawing. Application August 22, 1946, Serial No. 692,376

2 Claims. (Cl. 252—301.3)

This invention relates to fluorescent coloring materials particularly to a red fluorescent material.

In various processes it is desirable to have highly efficient fluorescent materials. For example, in U. S. Patent No. 2,319,079, Murray, there is described a palette of artist's coloring materials in which the red fluorescing one employs Rhodamine G in gum sandarac as its fluorescent ingredient. It has been found that the efficiency of this mixture when activated by ultraviolet radiation is not very high. The object of the present invention is to improve this efficiency.

The present invention is applicable to various red fluorescing dyes such as sulfonated rhodamines, for example, the one termed Xylene Red B (color index 748). The sulfonated rhodamines are somewhat more stable to light than either Rhodamine B or Rhodamine G. According to the present invention the fluorescent efficiency of the red fluorescent material is greatly enhanced by the addition of an ultraviolet absorber. The added material must have no fluorescence of its own to interfere with that of the rhodamine, it must be compatible with the rhodamine, and it must be a soluble material. The most satisfactory material which I have found for sensitizing Xylene Red B is Quinoline Yellow (color index 801). The application of this invention to Rhodamine B or Rhodamine G would require the spirit-soluble form of Quinoline Yellow, but I have found that a much higher degree of sensitization is gained by the Xylene Red-Quinoline Yellow combination. I use the term "sensitize" to refer to the increasing of the fluorescent efficiency; for equal amounts of fluorescigenous input (incident ultra violet) the red fluorescent output is much greater when the "sensitizer" is present.

It should be noted that the mere yellow color of this added ingredient is not sufficient to sensitize the rhodamine. For example, Hansa Yellow mentioned in the above-discussed Murray patent has no sensitizing effect possibly because it is a relatively insoluble pigment and furthermore tartrazine which is a soluble yellow dye desensitizes, rather than sensitizes, the rhodamine ingredients.

A preferred coloring material (specifically an ink) according to my invention is made up by the following formula:

| | Parts by weight |
|---|---|
| Shellac solution | 250 |
| Lithopone mixture | 200 |
| Xylene Red | 2 |
| Quinoline Yellow | 3 |
| Water | 150 |

The shellac solution in the above formula is made by dissolving 10 pounds of dewaxed shellac and 5 pounds of borax in 25 pounds of hot water. The lithopone mixture is made by grinding 5 pounds of lithopone and a dispersing agent such as 2½ ounces of a sodium salt of a polymerized sulfonic acid resin, with 6 pounds of water in a ball mill. The lithopone improves the brightness of the fluorescence when the ink is used on a more or less transparent material such as matte acetate sheet.

What I claim and desire to secure by Letters Patent of the United States is:

1. A red fluorescent coloring material having a fluorescence of the same hue and greater brightness than one with the same concentration of Xylene Red B alone, consisting substantially entirely of Xylene Red B, Quinoline Yellow in about equal amounts, and a vehicle comprising an aqueous solution of shellac and borax.

2. A red fluorescent coloring material having a fluorescence of the same hue and greater brightness than one with the same concentration of Xylene Red B alone, consisting substantially entirely of Xylene Red B, Quinoline Yellow in about equal amounts, a vehicle comprising an aqueous solution of shellac and borax, and lithopone.

JOHN A. C. YULE.

REFERENCES CITED

The following references are of record in the file of this patent:

UNITED STATES PATENTS

| Number | Name | Date |
|---|---|---|
| 2,113,973 | Addink | Apr. 12, 1938 |
| 2,152,856 | Switzer | Apr. 4, 1939 |
| 2,319,079 | Murray | May 11, 1943 |

OTHER REFERENCES

Dement: "Fluorochemistry," pp. 230, 246, 254, 262, and 263.